(12) United States Patent
Chen

(10) Patent No.: US 11,447,072 B2
(45) Date of Patent: Sep. 20, 2022

(54) MULTIFUNCTIONAL REARVIEW MIRROR

(71) Applicant: Chi-Hsiu Chen, New Taipei (TW)

(72) Inventor: Chi-Hsiu Chen, New Taipei (TW)

( * ) Notice: Subject to any disclaimer, the term of this patent is extended or adjusted under 35 U.S.C. 154(b) by 252 days.

(21) Appl. No.: 16/942,771

(22) Filed: Jul. 30, 2020

(65) Prior Publication Data
US 2022/0032845 A1 Feb. 3, 2022

(51) Int. Cl.
*B60R 1/06* (2006.01)
*B60R 1/12* (2006.01)
*B60Q 1/26* (2006.01)
*B60Q 1/34* (2006.01)
*G01S 15/08* (2006.01)
*G01S 7/521* (2006.01)

(52) U.S. Cl.
CPC .......... *B60R 1/0605* (2013.01); *B60Q 1/2665* (2013.01); *B60Q 1/343* (2013.01); *B60R 1/1207* (2013.01); *G01S 7/521* (2013.01); *G01S 15/08* (2013.01); *B60R 2001/1223* (2013.01); *B60R 2001/1276* (2013.01)

(58) Field of Classification Search
CPC ................ B60R 1/0605; B60R 1/1207; B60R 2001/1223; B60R 2001/1276; B60Q 1/2665; B60Q 1/343; B60Q 5/006; B60Q 9/007; G01S 7/521; G01S 15/08
See application file for complete search history.

(56) References Cited

U.S. PATENT DOCUMENTS

| | | | | |
|---|---|---|---|---|
| 2003/0055596 A1* | 3/2003 | Studt | ........................ | G08G 1/16 702/150 |
| 2009/0040306 A1* | 2/2009 | Foote | ........................ | B60R 1/04 348/148 |
| 2013/0043990 A1* | 2/2013 | Al-Jafar | ................. | B60Q 9/008 340/439 |

* cited by examiner

Primary Examiner — Sath V Perungavoor
Assistant Examiner — Tyler B Edwards
(74) Attorney, Agent, or Firm — Leong C. Lei

(57) ABSTRACT

A multifunctional rearview mirror includes a casing having first and second receiving spaces. A mirror is mounted to one side of the casing that is formed with the first receiving space. The second receiving space is located under the first receiving space and has a front surface formed with first through-holes. A distance detection and alarm unit is arranged in the second receiving space and includes an ultrasonic distance detection module, an alarm light module, and a buzzer. The ultrasonic distance detection module is eclectically connected with the alarm light module and the buzzer. The alarm light module is arranged in the first through-holes. The ultrasonic distance detection module emits an ultrasonic wave, which is returned to the ultrasonic distance detection module by an object, so that a distance to the object is calculated and the alarm light module and the buzzer are activated according to the distance.

6 Claims, 4 Drawing Sheets

MULTIFUNCTIONAL REARVIEW MIRROR

TECHNICAL FIELD OF THE INVENTION

The present invention relates to a rearview mirror of a large-sized automobile, and more particularly to a multifunctional rearview mirror having blind spot alarm and driving recording device.

DESCRIPTION OF THE PRIOR ART

A modern automobile alarm system is mostly arranged in combination with a blind spot detection system. A regular blind spot detection system relies on a sensor mounted on the automobile to detect if an object is present around the automobile body. Upon detection of an object approaching the automobile body, an alarm is given off. Particularly, a large-sized automobile, such as a bus, a cargo truck, a freight car, a flatcar, and a semi-trailer truck, is susceptible to a vision blind spot caused by an A pillar so as to easily cause an accident of colliding a vehicle or a pedestrian that is located nearby. The blind spot detection system may overcome the blind spot of vision of the driver to help ensure driving safety.

Technically, the known blind spot detection systems are classified as image-based systems and radar-based systems. The image-based system includes a camera that is mounted under a rearview mirror and the camera functions to capture an image on the rear side, and an image recognition technique is applied to determine the distance and speed of an automobile or a motorcycle on the rear side. However, weather conditions of poor visibility, such as thick fog, raining, or sand dust, often cause incorrect determination or even no detectability at all. Further, the radar-based system includes a sensor that is mounted on a left-side or right-side wing mirror or a left-side or right-side headlight or a let-side or right-side tail light or a front or rear bumper to identify a condition of a moving object, such as a vehicle or a pedestrian, through manipulation of a radar signal based on Doppler principle applied to frequency.

Compared to the image-based detection, the radar-based detection is less susceptible to influence of weather and lighting of nighttime. However, if cost is taken into consideration, an infrared radar or an ultrasonic radar is less costly, but the result of detection is still affected by weather factors, such as temperature variation or winds. A lidar provides an alternative that has high accuracy of identification and is not affected by external interference and has a fast response, but is expensive. Thus, it is an issue of technique developers to improve accuracy of radar detection while still meeting economic requirement of cost.

SUMMARY OF THE INVENTION

In view of the above drawbacks, the present invention provides a multifunctional rearview mirror, which comprises: at least one rearview mirror body, which comprises a casing and at least one mirror body. The casing includes a first receiving space and a second receiving space. The mirror body is rotatably mounted to one side of the casing that is formed with the first receiving space. The second receiving space is located under the first receiving space. The second receiving space has a front surface that is formed with a plurality of first through-holes. A distance detection and alarm unit is arranged in the second receiving space and comprises at least one ultrasonic distance detection module, an alarm light module, and a buzzer. The ultrasonic distance detection module is electrically connected with the alarm light module and the buzzer. The alarm light module is arranged in the first through-holes. The ultrasonic distance detection module is operable to emit an ultrasonic wave, and the ultrasonic wave, upon colliding and contacting an object, is returned to the ultrasonic distance detection module, so that a distance relative to the object is calculated and the alarm light module and the buzzer are activated according to the calculated distance.

DETAILED DESCRIPTION OF THE PREFERRED EMBODIMENT

Figure 1:
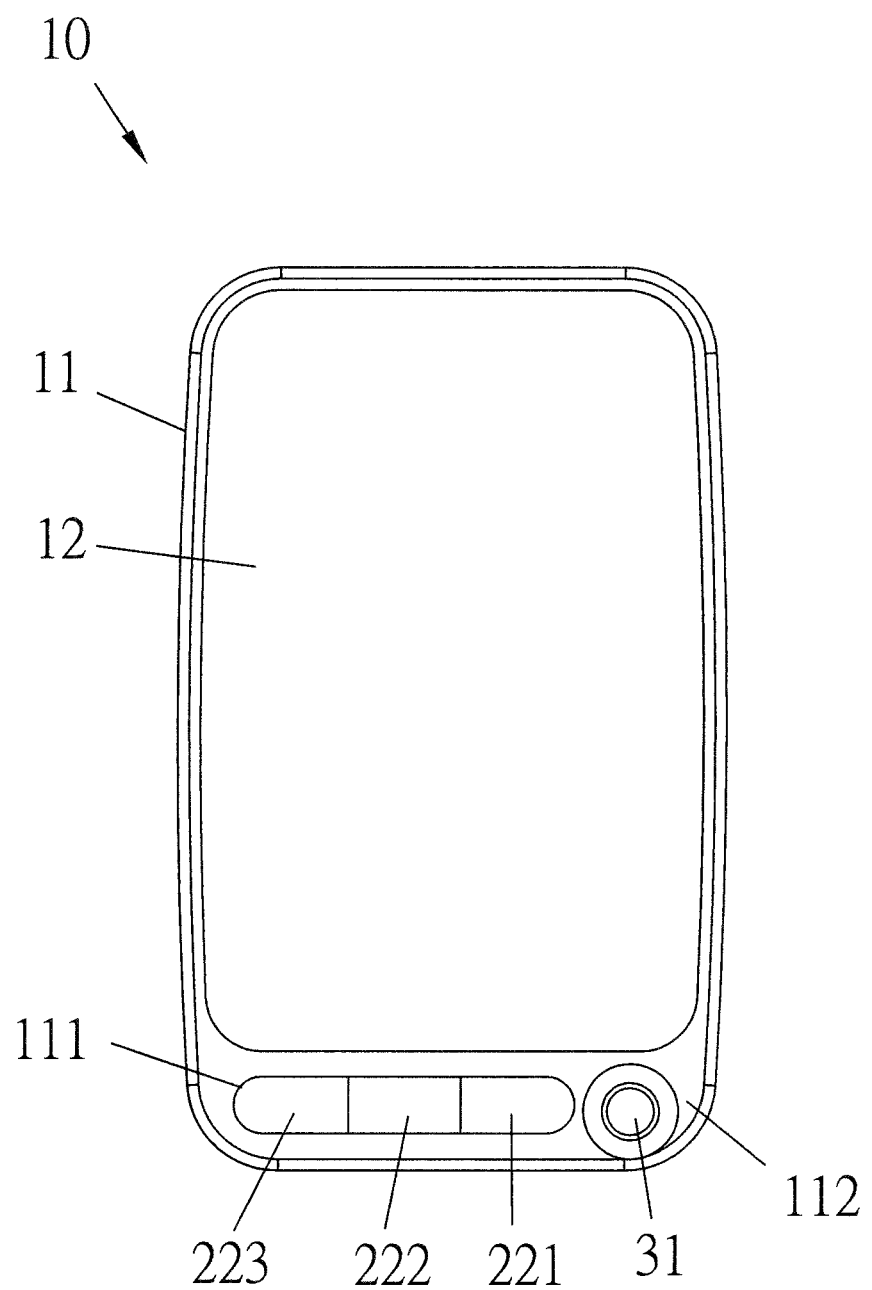
FIG. 1 is a front view of the present invention.
Figure 2:
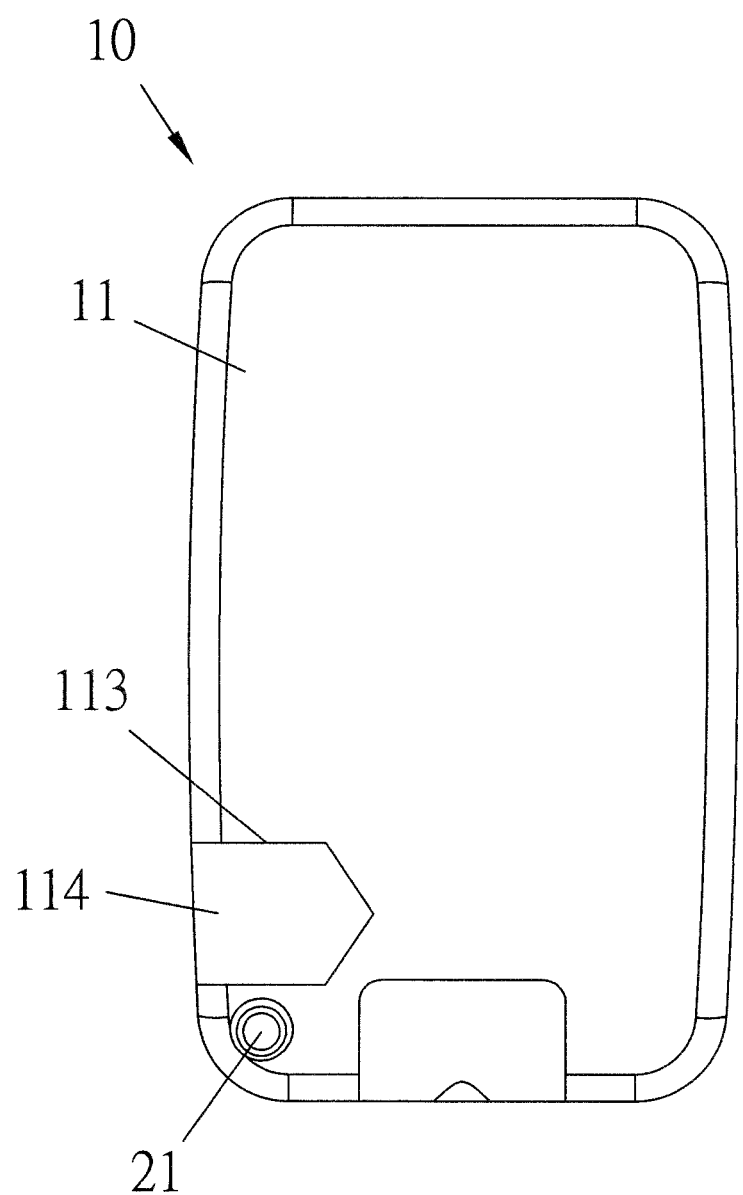
FIG. 2 is a rear view of the present invention.

Referring to FIGS. 1 and 2, the present invention provides a multifunctional rearview mirror, which comprises:

at least one rearview mirror body 10, which comprises a casing 11 and at least one mirror body 12, wherein the casing 11 includes a first receiving space (not shown) that is in communication with the outside and a second receiving space (not shown) that is a closed space; the mirror body 12 is rotatably mounted one side of the casing 11 that is formed with the first receiving space; the second receiving space is located under the first receiving space; the second receiving space has a front surface that is formed with a plurality of first through-holes 111 and a second through-hole 112 that is adjacent to the first through-holes 111; and the casing 11 has an outside surface that is formed with a recess 113 and a cover 114 that is light transmitting is provided to cover and close the recess 113.

Figure 3:
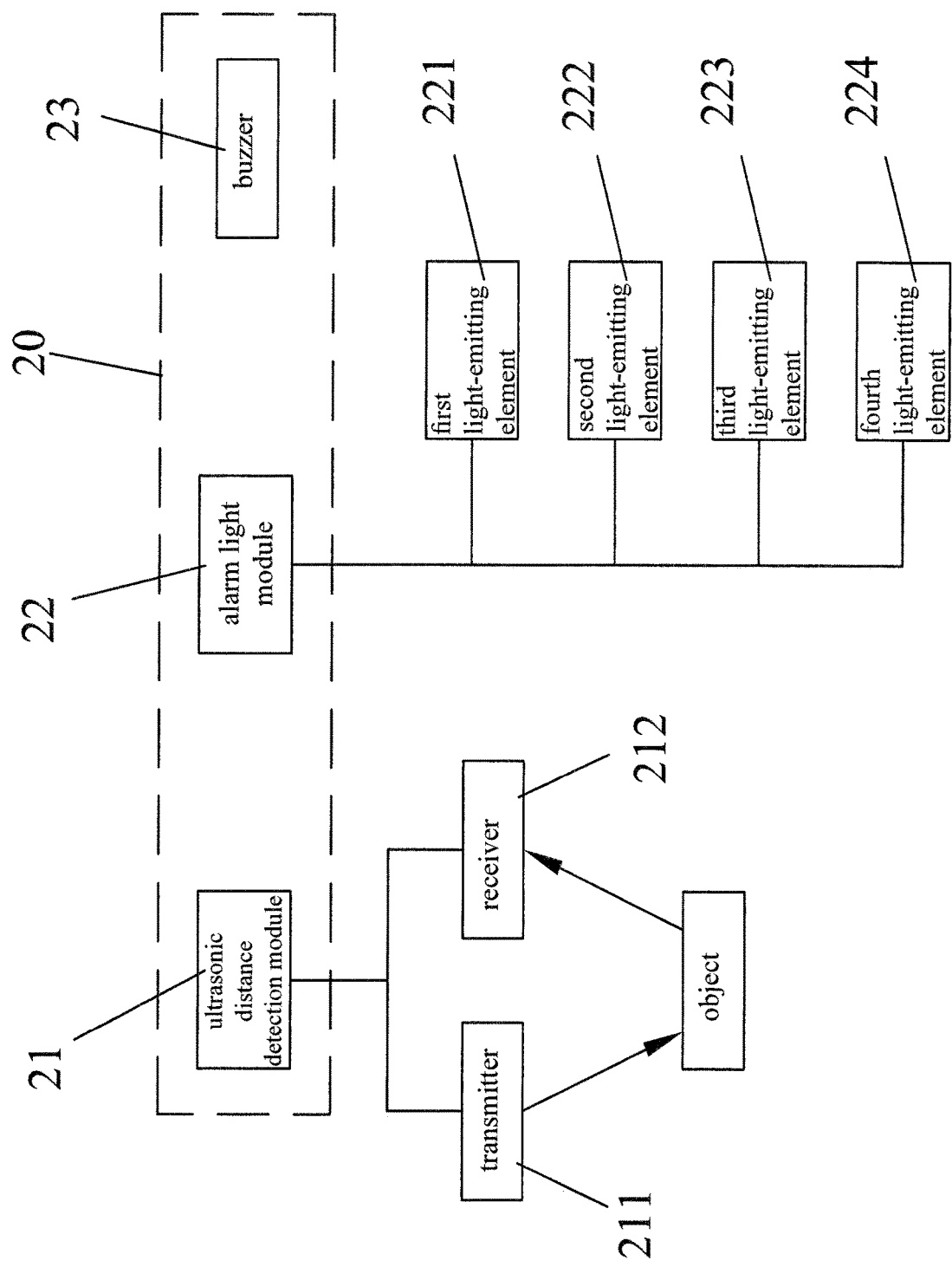
FIG. 3 is a block diagram illustrating a distance detection and alarm unit of the present invention.

Referring to FIGS. 1-3, a distance detection and alarm unit 20 is arranged and mounted in the second receiving space and comprises at least one ultrasonic distance detection module 21, an alarm light module 22, and a buzzer 23, the ultrasonic distance detection module 21 being electrically connected to the alarm light module 22 and the buzzer 23.

The ultrasonic distance detection module 21 comprises a transmitter 211 and a receiver 212.

The alarm light module 22 comprises a first light-emitting element 221, a second light-emitting element 222, a third light-emitting element 223, and a fourth light-emitting element 224. The first light-emitting element 221, the second light-emitting element 222, and the third light-emitting element 223 are each set in a respective one of the first through-holes, and the fourth light-emitting element 224 and the buzzer 23 are arranged and mounted in the recess 113.

A driving recorder comprises at least one lens 31 and a storage unit (not shown). The lens 31 is set to correspond to the second through-hole 112.

Figure 4:
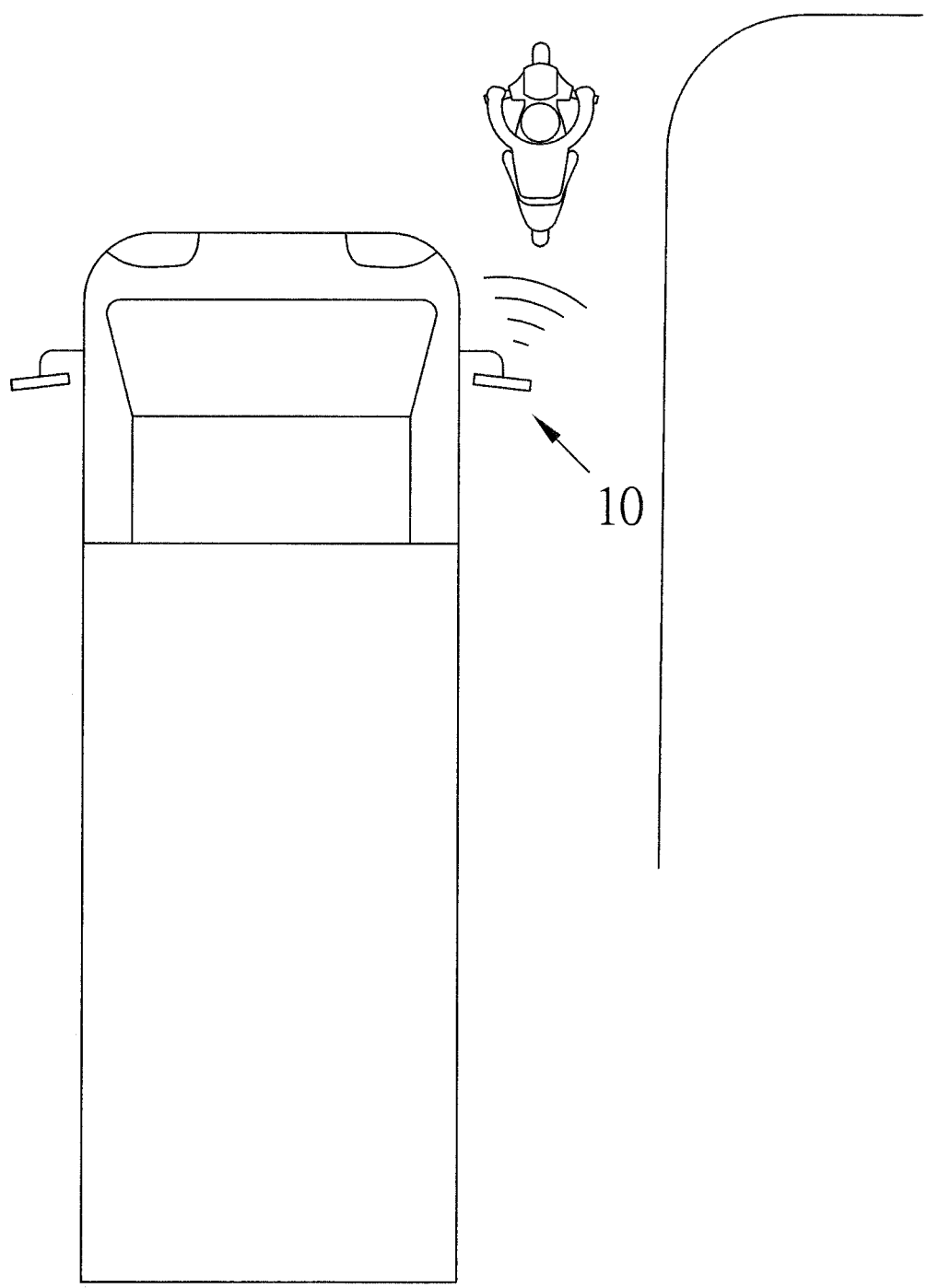
FIG. 4 is a schematic view illustrating an application of the present invention.

Referring to FIGS. 3 and 4, the transmitter of the ultrasonic distance detection module 21 transmits and emits an ultrasonic wave. The ultrasonic wave, when colliding and contacting an object, is returned and the receiver 212 of the ultrasonic distance detection module 21 detects and receives the returned ultrasonic wave, and also calculate a distance relative to the object, and activates the first light-emitting element 221, the second light-emitting element 222, or the third light-emitting element 223, and the buzzer 23 according to the distance.

When the distance detected by the ultrasonic distance detection module 21 is one meter, two meters, or three meters, the first light-emitting element 221, the second light-emitting element 222, or the third light-emitting element 223 are correspondingly activated to give off light, and based on the distance of the automobile relative to the object, an alarm sound issued by the buzzer 23 is getting faster and of higher frequency when the distance is getting shorter.

Further, in a practical application, the ultrasonic distance detection module 21 may be arranged to electrically connect with a steering unit (not shown) of the automobile. The steering unit comprises a turn signal lever (not shown), and when a driver pushes the turn signal lever, the ultrasonic distance detection module 21 is activated to emit the ultrasonic wave, and the fourth light-emitting element 224 is also activated.

I claim:

1. A multifunctional rearview mirror, comprising:
   at least one rearview mirror body, which comprises a casing and at least one mirror body, wherein the casing includes a first receiving space that is in communication with the outside and a second receiving space that is closed; the mirror body is rotatably mounted to one side of the casing that is formed with the first receiving space; the second receiving space is located under the first receiving space; and the second receiving space has a front surface that is formed with a plurality of first through-holes; and
   a distance detection and alarm unit, which is arranged in the second receiving space and comprises at least one ultrasonic distance detection module, an alarm light module, and a buzzer, wherein the ultrasonic distance detection module is electrically connected with the alarm light module and the buzzer; the alarm light module comprises a first light-emitting element, a second light-emitting element, and a third light-emitting element, and the first light-emitting element, the second light-emitting element, and the third light-emitting element are each arranged in a respective one of the first through-holes, wherein the ultrasonic distance detection module is operable to emit an ultrasonic wave, and upon contacting an object, the ultrasonic wave is returned to the ultrasonic distance detection module, and a distance relative to the object is calculated, such that the first light-emitting element, the second light-emitting element, or the third light-emitting element, and the buzzer are activated according to the distance.

2. The multifunctional rearview mirror according to claim 1, wherein the casing has an outside surface that is formed with a recess, and the buzzer is arranged in the recess.

3. The multifunctional rearview mirror according to claim 2, wherein the recess is provided therein with at least one fourth light-emitting element in electrical connection with the alarm light module, and the recess is provided thereon with a light-transmitting cover.

4. The multifunctional rearview mirror according to claim 1, wherein the first light-emitting element, the second light-emitting element, or the third light-emitting element is activated to emit light when the distance calculated by the ultrasonic distance detection module is one meter, two meters, or three meters.

5. The multifunctional rearview mirror according to claim 4, wherein the ultrasonic distance detection module is adapted to electrically connect with an automobile steering unit, the steering unit comprising a turn signal lever, wherein when the turn signal lever is operated, the ultrasonic distance detection module is activated to emit the ultrasonic wave.

6. The multifunctional rearview mirror according to claim 1, wherein the second receiving space is provided with a second through-hole formed in the front surface and located adjacent to the first through-holes, the second receiving space being provided therein with a driving recorder, which comprises at least one lens and a storage unit, the lens corresponding to the second through-hole.

* * * * *